(12) United States Patent
Wang et al.

(10) Patent No.: US 8,937,768 B2
(45) Date of Patent: Jan. 20, 2015

(54) OPTICAL COMPONENTS WITH OPTICAL LENSES HAVING EMBEDDED ELEMENTS

(75) Inventors: Wenlu Wang, Ottawa (CA); Kinwai Leong, Ottawa (CA); Yunqu Liu, Ottawa (CA)

(73) Assignee: Viscore Technologies Inc., Ontario (CA)

( * ) Notice: Subject to any disclaimer, the term of this patent is extended or adjusted under 35 U.S.C. 154(b) by 931 days.

(21) Appl. No.: 13/100,893

(22) Filed: May 4, 2011

(65) Prior Publication Data
US 2011/0273772 A1    Nov. 10, 2011

(51) Int. Cl.
*G02B 27/28*    (2006.01)
(52) U.S. Cl.
CPC ..................................... *G02B 27/283* (2013.01)
USPC ............... 359/489.08; 359/489.09; 359/489.2

(58) Field of Classification Search
None
See application file for complete search history.

(56) References Cited

U.S. PATENT DOCUMENTS 4,978,189 A * 12/1990 Blonder et al. .................. 385/35
6,249,619 B1 * 6/2001 Bergmann et al. .............. 385/11

* cited by examiner

*Primary Examiner* — Arnel C Lavarias
(74) *Attorney, Agent, or Firm* — Rosenberg, Klein & Lee

(57) ABSTRACT

An optical component has a lens including a further optical component therein. The further optical component acts upon light propagating within a portion of the lens but not on light propagating within a second other portion of the lens. A simple configuration involves a lens having a slot for having the optical component inserted therein. Optical components including the lens with further optical component include beam splitters and beam combiners.

21 Claims, 9 Drawing Sheets

OPTICAL COMPONENTS WITH OPTICAL LENSES HAVING EMBEDDED ELEMENTS

FIELD OF THE INVENTION

The invention relates to optical components and more particularly to passive optical components for splitting and/or combining signals.

BACKGROUND

A beam splitter is an optical device that splits a beam of light into two separate beams of light. Often, beam splitters are used to divide light into two beams that each comprises same information. Sometimes, however, it is useful to separate a beam into two separate and different beams of light based on an identifiable parameter.

Polarising beam splitters divide a beam of light based on a polarisation component thereof. For example, a Wollaston prism uses birefringent materials, for splitting light into constituent portions—separate optical signals—of differing polarisation.

Using a polarisation beam splitter and combiner allows, for example, for polarisation modulation of optical signals. Signals provided from traditional polarisation beam splitters have different polarisations and are therefore ill suited to being efficiently coupled into a same waveguide.

It would be advantageous to provide a beam splitter that supports polarisation beam splitting and rotation for coupling to a waveguide.

SUMMARY OF THE INVENTION

In accordance with an embodiment of the invention, there is provided an optical component comprising: a polarisation beam splitter comprising a PBS output port, the polarisation beam splitter for receiving a first optical signal and for separating the first optical signal into a second optical signal and a third optical signal based on a polarisation thereof; a first lens for receiving the second optical signal and the third optical signal from the polarisation beam splitter and for propagating the second optical signal and the third optical signal to an output port for coupling with a waveguide, the first lens including an opening therein for accommodating another optical component; and, a polarisation rotation component for rotating a polarisation of the second optical signal relative to the third optical signal and disposed within the opening of the first lens.

In accordance with an embodiment of the invention, there is provided an optical component comprising: a one piece lens having an opening therein having a first face portion and a second face portion opposing the first face portion, the opening for accommodating an other optical component, the opening disposed within the lens for in use propagating an optical signal from the first face portion to an other optical component within the opening and then back to the lens via the second face portion.

BRIEF DESCRIPTION OF THE DRAWINGS

Embodiments of the invention and prior art will now be described in conjunction with the following drawings, in which.

DETAILED DESCRIPTION OF EMBODIMENTS OF THE INVENTION

Figure 1:
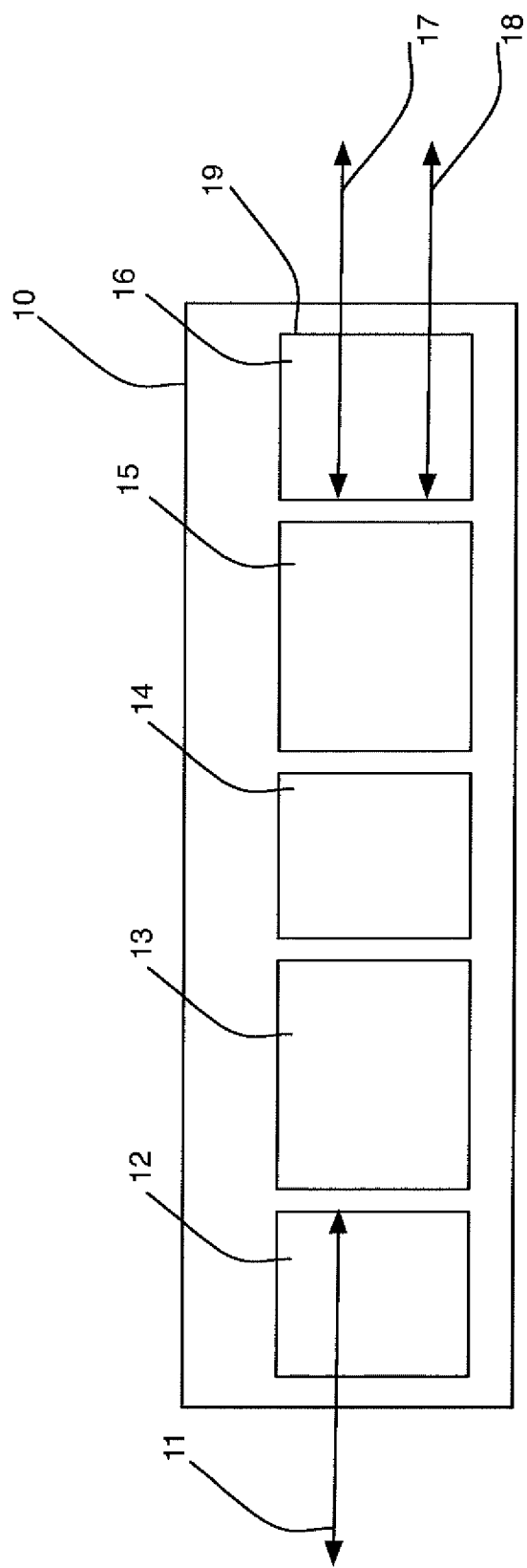
FIG. 1 illustrates a prior art bulk optics polarisation beam splitter/combiner.

Referring to FIG. 1, shown is a simplified side view of a prior art splitter/combiner 10. An optical signal 11 having two components polarised orthogonally one relative to the other is provided to the optical splitter/combiner 10. The signal propagates within tube 12 and is then focused by lens 13 onto the polarisation beam splitter/polarisation beam combiner (PBS/PBC) 14 where it is separated into two separate signals each having a different polarisation, one orthogonal to the other. The two separate signals then propagate through lens 15 and exit via tube 16 and port 19 as two separate optical signals 17 and 18, respectively. Optical signal 17 is polarised differently from optical signal 18, typically one polarised 90 degrees relative to the other.

The two optical signals 17 and 18 are each processable by different bulk optics. When integrated optics in the form of a PLC chip is used for processing of the optical signals, one of the two optical signals is of a polarisation that is ill suited to coupling with the PLC chip. Therefore, a polarisation of that optical signal is typically rotated in order to facilitate coupling with a PLC chip, for example using a half wave plate.

Figure 2:
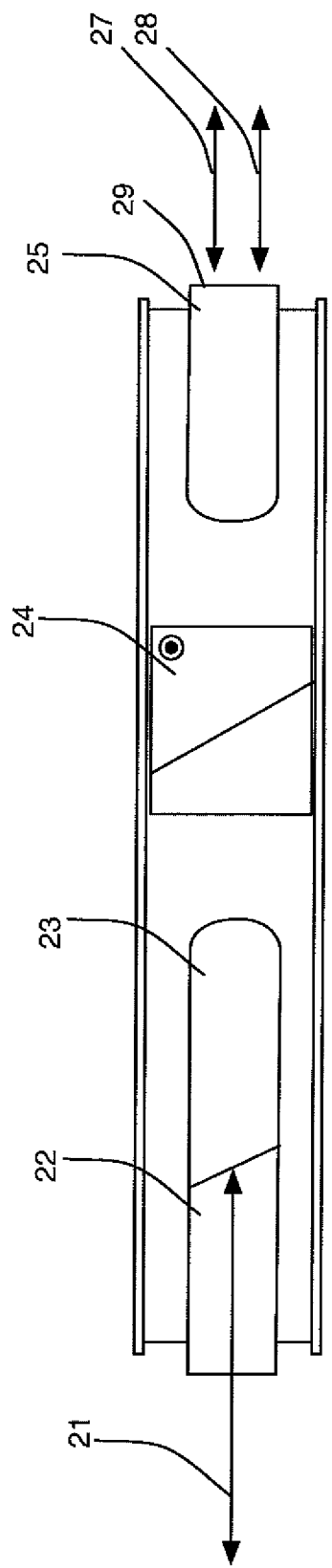
FIG. 2 illustrates a prior art bulk optics polarisation beam splitter/combiner relying on a Wollaston Prism.

Referring to FIG. 2, shown is a similar prior art configuration to that of FIG. 1 using a Wollaston Prism as the PBS/PBC. An optical signal 21 having two components polarised orthogonally, one relative to the other, is provided to the optical splitter/combiner. The signal propagates within tube 22 and is then focused by lens 23 onto the Wollaston Prism PBS/PBC 24 where it is separated into two separate signals each having a different polarisation, one orthogonal to the other. The two signals then propagate through lens 25 and exit via port 29 as two separate optical signals 27 and 28, respectively. Optical signal 27 is polarised differently from optical signal 28, typically one polarised 90 degrees relative to the other.

The two optical signals 27 and 28 are each processable by different bulk optics. When integrated optics in the form of a PLC chip is used for processing of the optical signals, one of the two optical signals is of a polarisation that is ill suited to coupling with the PLC chip. Therefore, a polarisation of that optical signal is typically rotated in order to facilitate coupling with a PLC chip, for example using a half wave plate.

Figure 3:
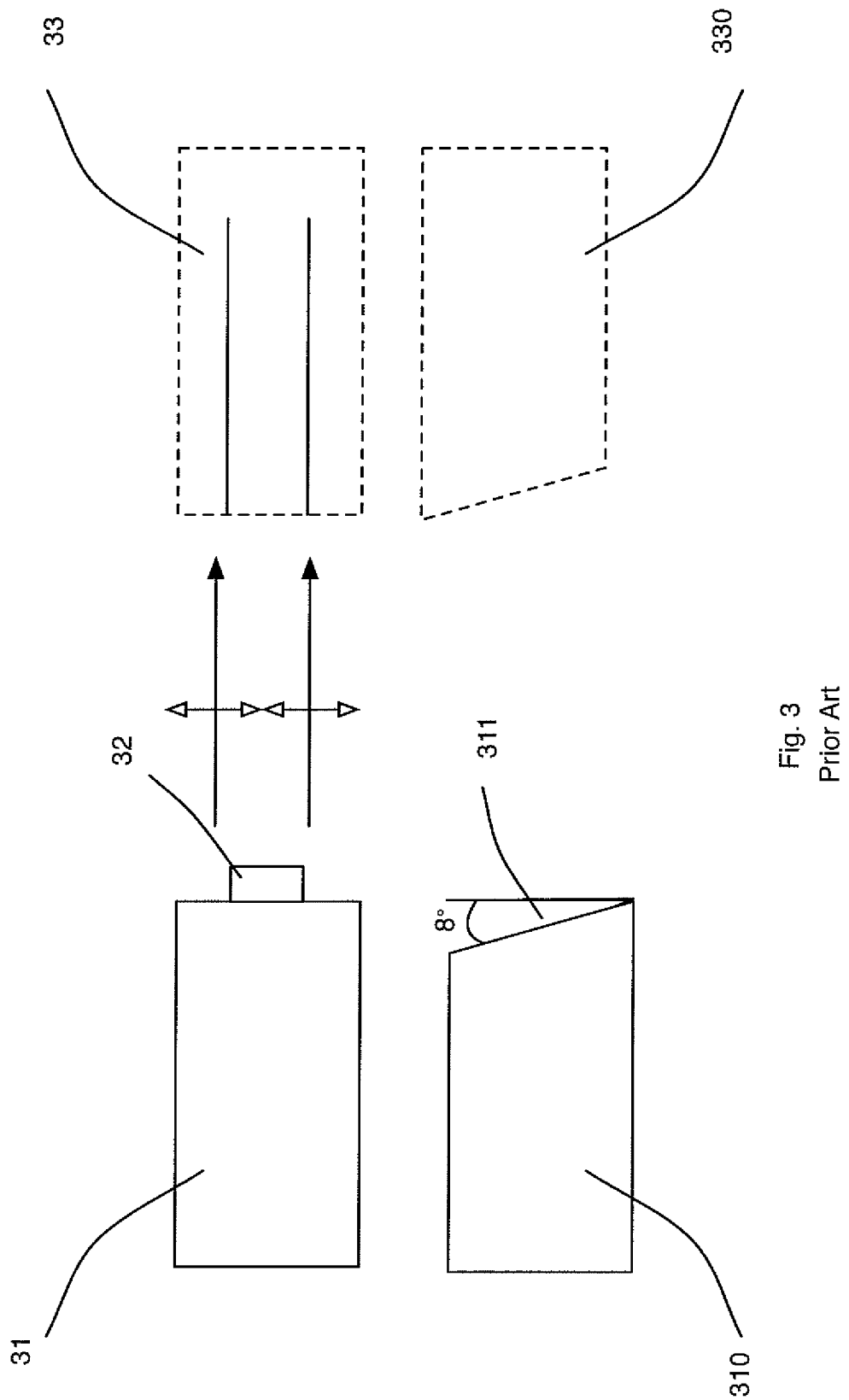
FIG. 3 illustrates a prior art bulk optics polarisation beam splitter/combiner having a polarisation rotating component for rotating a polarisation of one of the resulting output signals for coupling to a waveguide.

Referring to FIG. 3, shown is a top view of a prior art polarisation beam splitter/combiner. The PBS/PBC 31 is shown with a half wave plate 32 attached to an output face thereof. The half wave plate 32 rotates the polarisation of one of the signals (the signal exiting the PBS 31 nearer the bottom of the diagram) for coupling to a waveguide 33. Focusing optics (not shown) are used to ensure that the two optical signals having their polarisations correctly aligned are effectively coupled to the waveguide 33. Similarly, for an angled end face 311 of PBS/PBC 310, a half wave plate is used for half of the angled end face 311 prior to focusing signals exiting the PBS/PBC 310 to PLC 330 using focusing optics (not shown).

The prior art suffers from several problems. First, the space occupied by the half wave plate, its thickness, defines a minimum gap for the other optical signal to traverse to couple to the waveguide. In order to avoid focusing optics, this gap must be quite small to ensure adequate coupling. Thus, if the half wave plate is too thick, focusing optics are required or significant insertion loss results.

An advantage of integrated optics is ease of assembly and resilience; however, joint strength is compromised by the large gap between the PLC and the PBS/PBC reducing resiliency. With the additional gap between the PBS/PBC and the waveguide, assembly is complicated due to the very small tolerances for focusing optics. Alternatively, thin half wave plates are quite expensive relative to thicker half wave plates adding significantly to the overall component cost.

Since the half wave plate and the epoxy is at or near a focal point of the two optical signals, the present configurations are ill suited for high power application. The focused optical signals will present most of their energy at or about a single point resulting in heating of the epoxy and of the half wave plate within a very focused location. Using cost effective components and epoxy, this configuration is not well suited to higher power optical signals.

Figure 4:
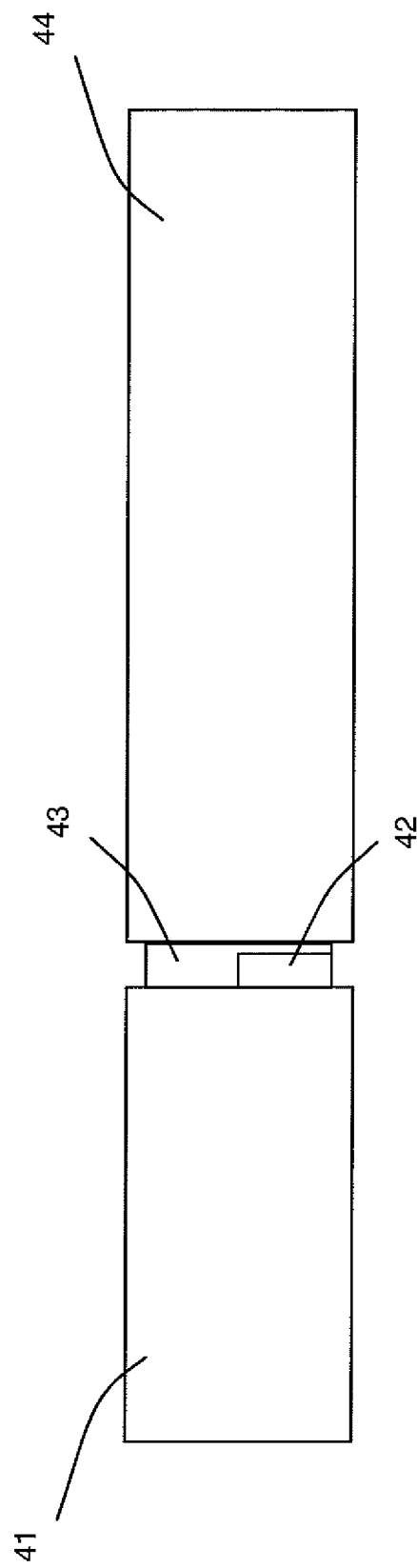
FIG. 4 illustrates a prior art bulk optics polarisation beam splitter/combiner coupled to a waveguide and having a polarisation rotating component for rotating a polarisation of one of the resulting output signals for coupling to a waveguide.

Referring to FIG. 4, shown is another diagram of a prior art PBS/PBC. Here PBS 41 splits an optical signal into two component signals based on polarisation. The two signals exit from the PBS 41 and one passes through a half wave plate 42 while the other passes through a gap 43. During manufacture, the gap is filled with epoxy which is used to maintain the parts in fixed relation one to another. The resulting optical signals having a same polarisation are then coupled into two waveguides within a same PLC 44. The thick block of epoxy is not well suited to high power applications and is also not as strong as a thinner layer of epoxy holding two components together. Further, coupling efficiency is reduced when the half wave plate 42 is too thick, as is usually the case.

Figure 5:
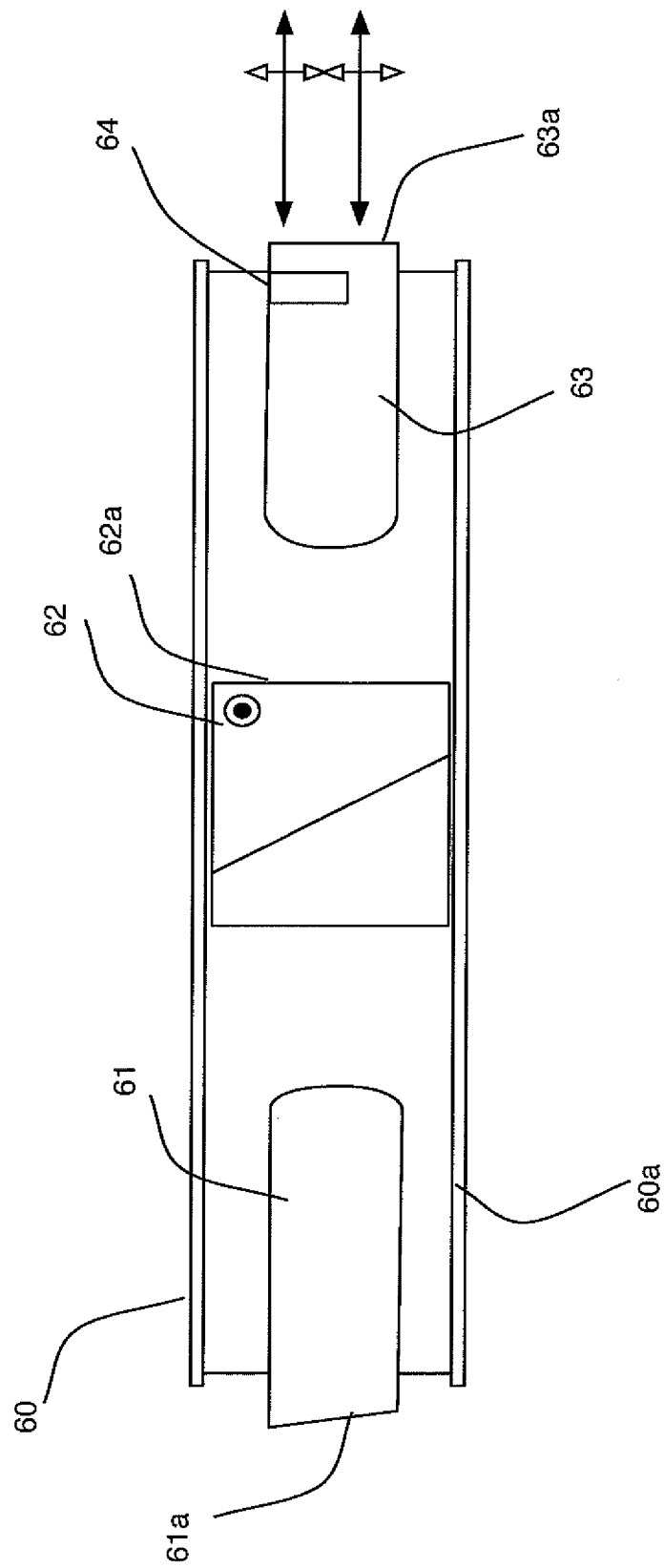
FIG. 5 illustrates a bulk optics polarisation beam splitter/combiner having a polarisation rotating component within a slot within a lens of the polarisation beam splitter/combiner for rotating a polarisation of one of the resulting output signals for coupling to a waveguide.

Referring to FIG. 5, shown is a simplified cross sectional view of an embodiment of the invention. Here the polarisation beam splitter/polarisation beam combiner 60 is shown housed within a tube 60 a. A first optical signal is provided at input port 61 a to an input lens 61 for focusing thereof. From the input lens 61, the signal propagates to a PBS/PBC in the form of a Wollaston Prism 62. At PBS output port 62 a of the Wollaston Prism two separate signals are provided, a second optical signal and a third optical signal, each with a different polarisation. The signals are both coupled into lens 63 for focusing thereof and for coupling of each of the second optical signal and the third optical signal with a waveguide, for example. As such, a half wave plate is inserted within the optical path of the second optical signal without substantially varying an output port of the lens 63. Here a notch is etched from the lens 63 to accommodate a half wave plate therein. By inserting the half wave plate 64 within the notch, the second optical signal's polarisation is affected as necessary for coupling to the waveguide, and the output port 63 a of the lens 63 remains flat such that maintaining a very close coupling distance between lens 63 and a waveguide is simplified. Preferably, the opening into which the half wave plate 64 is inserted does not extend within the optical path of the third optical signal. Further, joint strength is not compromised since the joint is symmetric about end face 63 a.

Figure 6:
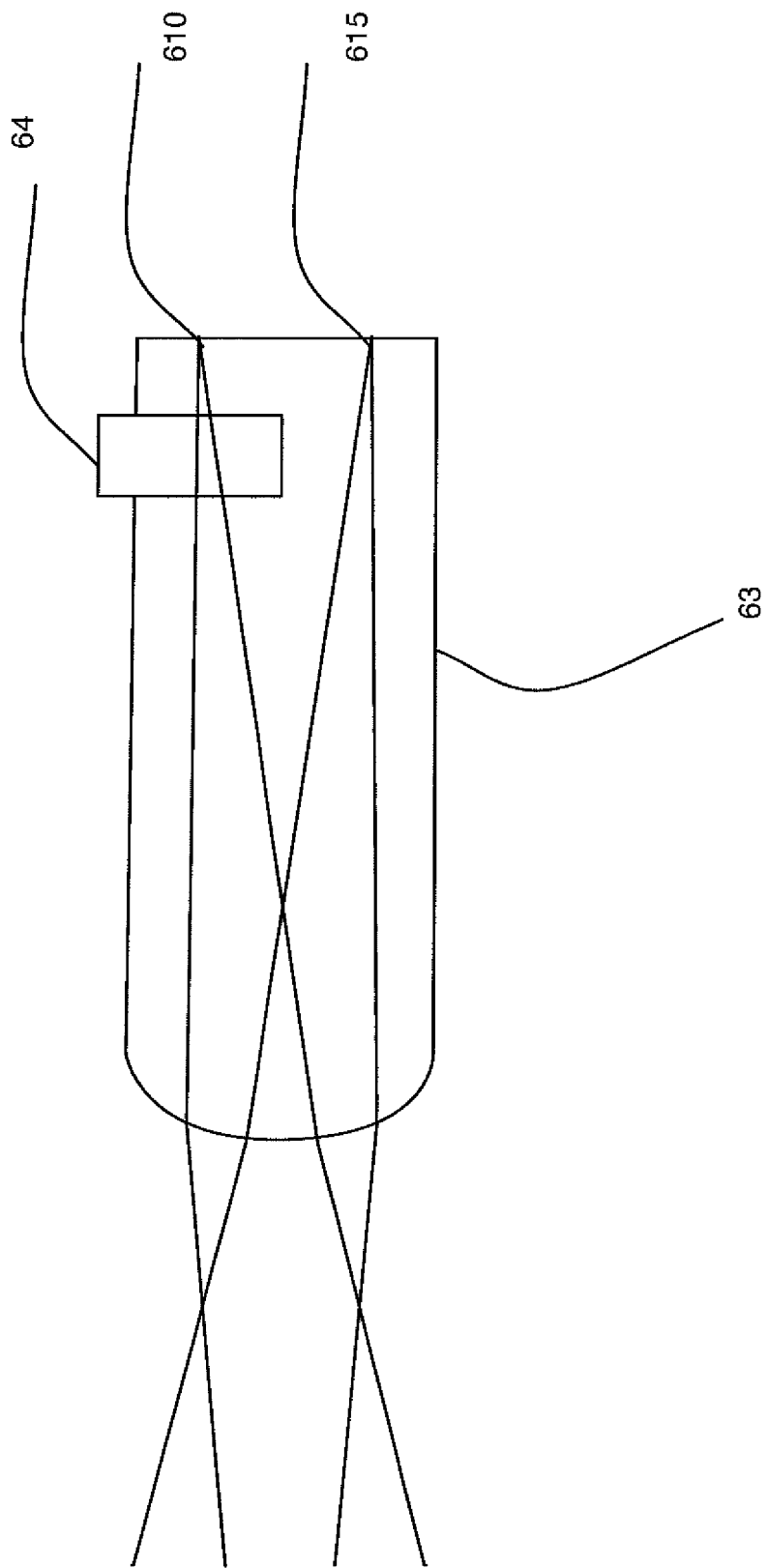
FIG. 6 illustrates the lens of FIG. 5 showing the second optical signal path and the third optical signal path therein.

Referring to FIG. 6, shown is a cross sectional view of two optical signals, a second optical signal 610 and a third optical signal 615, propagating within the lens 63. As is shown, half wave plate 64 is disposed for affecting the second optical signal 610 propagating within the lens 63. That said, there are numerous places within the lens 63 where that would be the case. Further, the opening location in the form of a slot location is selectable within the lens 63 allowing for placement of the half wave plate 64 at different locations while supporting similar functionality. For example, by placing half wave plate 64 where the optical signal is less focused higher power operation of the device is supported.

Figure 7:
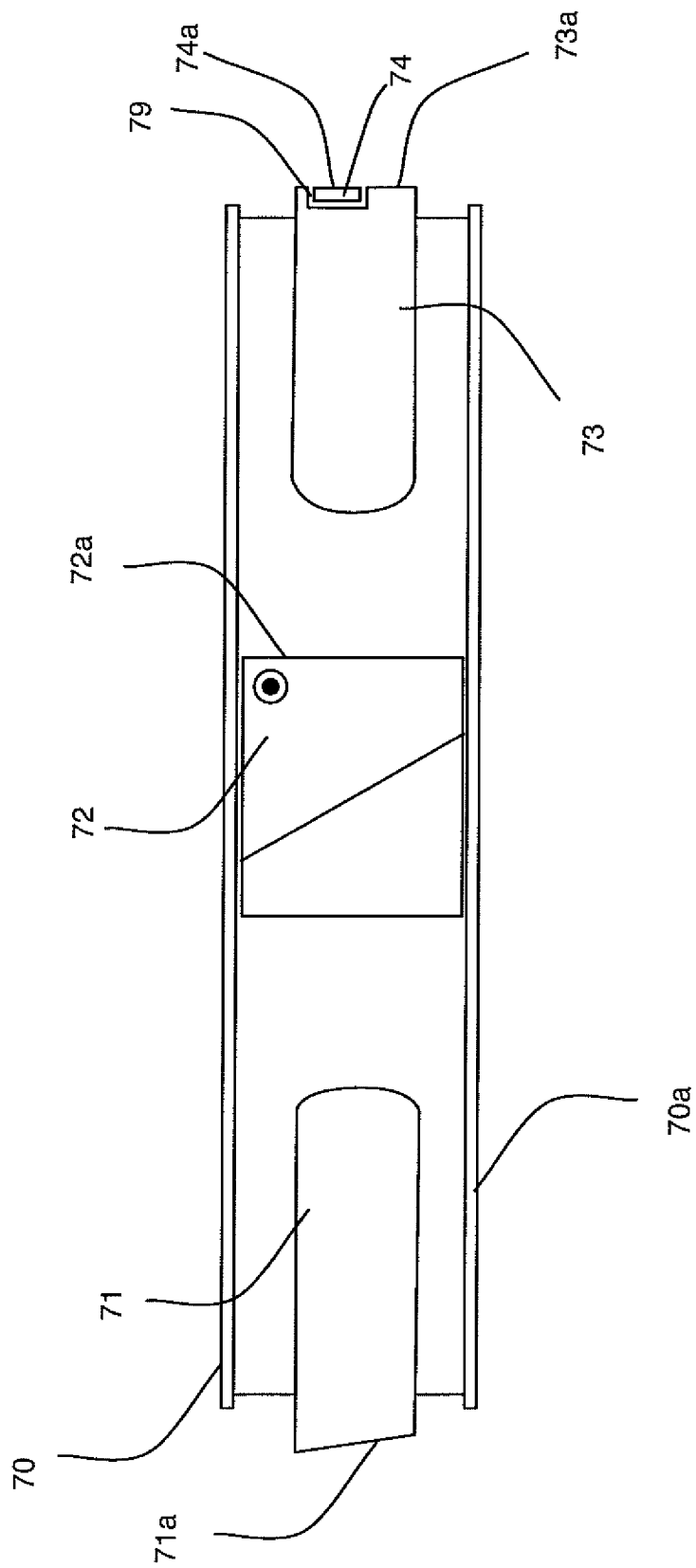
FIG. 7 illustrates a bulk optics polarisation beam splitter/combiner having a polarisation rotating component within a slot within an end face of a lens of the polarisation beam splitter/combiner for rotating a polarisation of one of the resulting output signals for coupling to a waveguide.

Referring to FIG. 7, shown is another embodiment of the invention wherein the opening in the form of a slot is formed in an end face of the lens. Here the polarisation beam splitter 70 is shown housed within a tube 70 a. A first optical signal is provided at input port 71 a to an input lens 71 for focusing thereof. From the input lens 71, the first optical signal propagates to a polarisation beam splitter in the form of a Wollaston Prism 72. At PBS output port 72 a of the Wollaston Prism two separate signals, a second optical signal and a third optical signal are provided each with a different polarisation. The signals are both coupled into lens 73 for focusing thereof and for coupling of each of the second and third optical signals with a waveguide, for example. As such, a half wave plate is inserted into an opening within the lens 73 in the form of slot 79 and within the optical path of the second optical signal. Of note, the half wave plate 74 fills the opening and an output port 74 a of the half wave plate is approximately planar with output port 73 a of the lens 73. The opening forms a slot in output port side of the lens 73 a and is etched from the lens 73 to accommodate insertion of half wave plate 74 therein. By inserting the half wave plate 74 within the slot, the optical signal's polarisation is affected as necessary for coupling to the waveguide and the output port of the lens 73 remains approximately flat such that maintaining a very close coupling distance between lens 73 and a waveguide is simplified. Further, joint strength is not compromised since the joint is symmetric about end faces 73 a and 74 a. Of course, output ports 73 a and 74 a need not be exactly coplanar so long as any offset therebetween does not affect the resulting spacing between lens 73 and a waveguide to which the second and third optical signals are to be coupled in a fashion that substantially degrades coupling therebetween.

Figure 8:
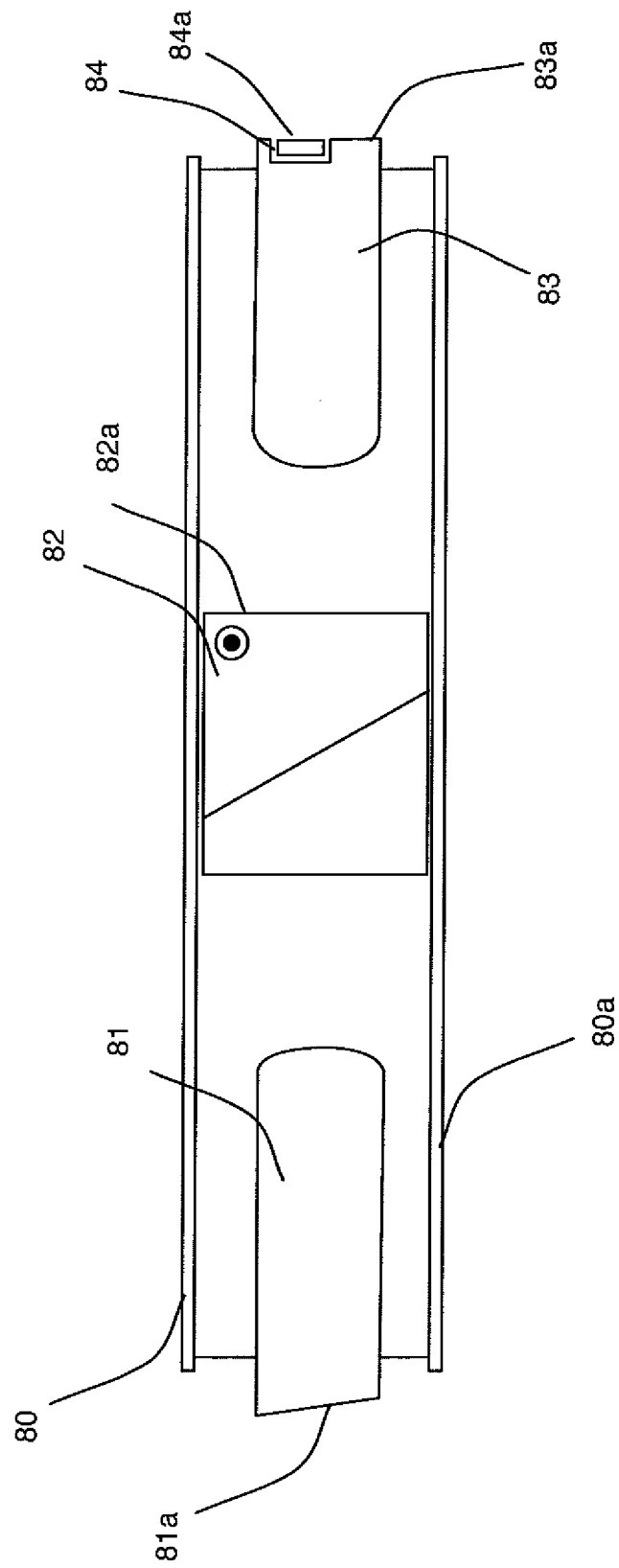
FIG. 8 illustrates a bulk optics polarisation beam splitter/combiner having a polarisation rotating component within a notch within a lens of the polarisation beam splitter/combiner for rotating a polarisation of one of the resulting output signals for coupling to a waveguide; and, FIGS. 9a and 9b illustrate bulk optics polarisation beam splitter/combiner components formed of several optical parts affixed one to another.

Referring to FIG. 8, shown is another embodiment of the invention wherein the opening in the form of a notch is formed in an end face of the lens. Here the polarisation beam splitter 80 is shown housed within a tube 80 a. A first optical signal is provided at input port 81 a to an input lens 81 for focusing thereof. From the input lens 81, the first optical signal propagates to a polarisation beam splitter (PBS/PBC) in the form of a Wollaston Prism 82. At PBS/PBC output port 82 a of the Wollaston Prism two separate signals, a second optical signal and a third optical signal, are provided each with a different polarisation. The signals are both coupled into lens 83 for focusing thereof and for coupling of each of the second and third optical signals with a waveguide, for example. As such, a half wave plate is inserted into an opening within the lens 83 in the form of a notch and within the optical path of the second optical signal. Of note, the half wave plate 84 fills at least part of the notch and an output port 84 *a* of the half wave plate is approximately planar with output port 83 *a* of the lens 83. The opening forms a notch in output port side of the lens 83 *a* and is etched from the lens 83 to accommodate insertion of half wave plate 84 therein. By inserting the half wave plate 84 within the notch, the optical signal's polarisation is affected as necessary for coupling to the waveguide and the output port of the lens 83 remains approximately flat such that maintaining a very close coupling distance between lens 83 and a waveguide is simplified. Further, joint strength is not compromised since the joint is the symmetric about end faces 83 *a* and 84 *a*. Of course, output ports 83 *a* and 84 *a* need not be exactly coplanar so long as any offset therebetween does not affect the resulting spacing between lens 83 and a waveguide to which the second and third optical signals are to be coupled in a fashion that substantially degrades coupling therebetween.

In an alternative embodiment, a lens is formed of several pieces that are assembled with the other optical component. For example, a lens is cut into two pieces and an optically neutral component and, for example, a half wave plate are disposed between the two lens portions and affixed together. The resulting lens assembly comprises one path through the half wave plate and another bypassing said plate. Further optionally, the optically neutral component is not used and the gap is filled with epoxy. Though the joint strength may be lessened, it is less likely to be of significant concern within a single component than when joining a plurality of components.

Figure 9A:
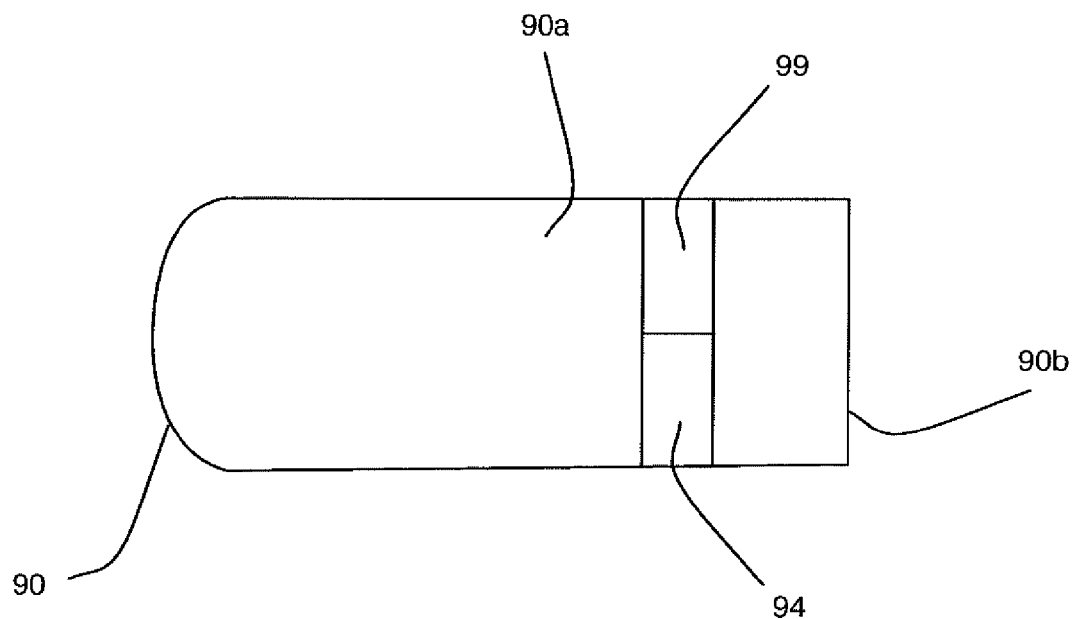
Figure 9B:
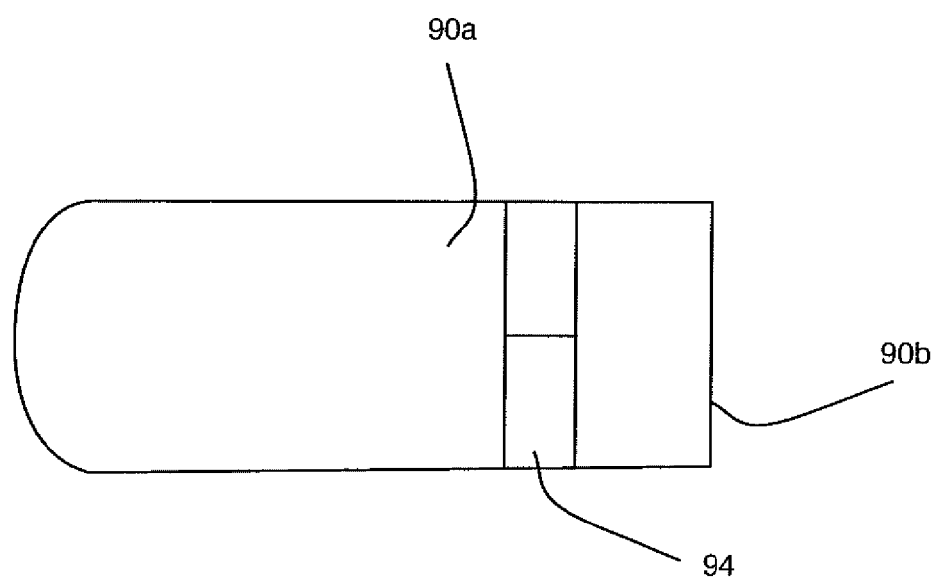

Referring to FIGS. 9*a* and 9*b* there are shown such an assembly. In FIG. 9*a* there is shown a lens 90 having two portions 90 *a* and 90 *b*. Interposed between the two portions is half wave plate 94 and an optical component 99. Optionally, a single lens is cut into three pieces, 90 *a*, 90 *b*, and another piece. The other piece is then cut to accommodate the half wave plate 94 resulting in optical component 99. In another embodiment, optical component 99 is optically neutral. In FIG. 9*b* there is shown another embodiment wherein optical component 99 is absent and the gap left by its absence is filled with epoxy. Here the lens 90 comprises two portions 90 *a* and 90 *b*. Interposed between lens portion 90 *a* and lens portion 90 *b* is a half wave plate disposed to cover only one side of each lens portion's end face. As such, a gap remains on the other side (where optical component 99 is depicted in FIG. 9*a*). The components are then affixed one to another with epoxy, which also acts to fill the gap.

In the embodiments of the invention shown, it is possible to replace the half wave plate with another optical component. For example, an optically neutral component is inserted within the slot or notch. Alternatively, another optical component is inserted.

Though a half wave plate is used within the above description to perform polarisation rotation on the second optical signal, a polarisation rotation component or a polarisation modifying component is also envisaged in its place. For example, a ¼ wave plate is useful in some applications. Further, other polarisation modification components are also envisaged in so far as they can be accommodated within a slot or notch in a lens.

Though a C lens is shown in the drawings, a number of lenses that are suitable for propagating 2 separate signals therein are suitable for use with the present invention.

Numerous other embodiments may be envisaged without departing from the spirit or scope of the invention.

What is claimed is:

1. An optical component comprising:
a polarisation beam splitter (PBS) comprising a PBS output port, the polarisation beam splitter for receiving a first optical signal and for separating the first optical signal into a second optical signal and a third optical signal based on a polarisation of each of the second signal and the third signal;
an output port for coupling with a first waveguide;
a first lens for receiving the second optical signal and the third optical signal from the polarisation beam splitter and for propagating the second optical signal and the third optical signal to the output port for coupling with second and third waveguides respectively, the first lens including an opening therein for accommodating another optical component; and,
a polarisation rotation component for rotating a polarisation of the second optical signal relative to the third optical signal and disposed within the opening of the lens.

2. An optical component according to claim 1, wherein the opening is disposed substantially within an optical path of the second optical signal and substantially outside an optical path of the third optical signal.

3. An optical component according to claim 1, wherein the opening comprises a slot having a size and shape for mating with the polarisation rotation component.

4. An optical component according to claim 1, wherein the polarisation rotation component comprises a half wave plate.

5. An optical component according to claim 1, wherein the polarisation beam splitter comprises a Wollaston Prism.

6. An optical component according to claim 1, wherein the polarisation rotation component is thicker than would support an effective free space coupling distance for the third optical signal between the polarisation beam splitter and a waveguide with the polarisation rotation component disposed therebetween.

7. An optical component according to claim 1, wherein the first lens comprises a lens input port and a lens output port, wherein the opening comprises at least a sidewall, and wherein the first lens is positioned for receiving light at the lens input port from the PBS output port and for providing light from the lens output port for coupling to the second and third waveguides respectively, wherein intermediate the lens input port and the lens output port and within an optical path of the second optical signal is disposed the polarisation rotation component, the second optical signal coupled from the lens to the polarisation rotation component and from the polarisation rotation component back to the lens via one or more sidewall of the at least a sidewall.

8. An optical component according to claim 7 wherein the opening is substantially rectangular in cross section and wherein light propagates to the polarisation rotation component via a first sidewall of the at least a sidewall and couples back to the lens via a second other opposing sidewall of the at least a sidewall.

9. An optical component according to claim 1, wherein the first lens comprises a first lens input port and a first lens output port and a second lens output port and wherein the first lens is positioned for receiving at the first lens input port the second optical signal and the third optical signal from the PBS output port and for providing light from the first lens output port for coupling to one of the second waveguide and the third waveguide respectively and from the second lens output port for coupling to the other of the second waveguide and the third waveguide via the polarisation rotation component, wherein the first lens output port and the second lens output port are disposed within approximately a same plane and wherein light propagating in a same direction passes through said approximately same plane in a same direction while exiting each of the first lens output port and the second lens output port.

10. An optical component according to claim 9 wherein the first lens comprises a notch disposed at an output end thereof, the notch sized to accommodate the polarisation rotation component and wherein the polarisation rotation component once affixed within said notch forms part of an approximately planar end face of the optical component comprising the first lens output port and the second lens output port.

11. An optical component according to claim 1, wherein the opening is at least one of etched into the lens and sawn into the lens.

12. An optical component according to claim 1, wherein the position of the opening within the first lens for accommodating another optical component is determined in dependence upon at least a target optical performance of the optical component.

13. An optical component according to claim 12, wherein the target optical performance is optical power handling.

14. An optical component according to claim 1, wherein the opening is formed within the end face of the lens.

15. An optical component comprising:
    a polarisation beam splitter (PBS) comprising a PBS output port, the polarisation beam splitter for receiving a first optical signal and for separating the first optical signal into a second optical signal and a third optical signal based on a polarisation of each of the second signal and the third signal;
    an output port for coupling with a first waveguide;
    a first lens for receiving the second optical signal and the third optical signal from the polarisation beam splitter and for propagating the second optical signal and the third optical signal to the output port for coupling with second and third waveguides respectively, the first lens including an opening therein for accommodating another optical component; and,
    an optical element for adjusting a characteristic of the second optical signal relative to the third optical signal and disposed within the opening of the lens.

16. An optical component according to claim 15, wherein the opening is disposed substantially within an optical path of the second optical signal and substantially outside an optical path of the third optical signal.

17. An optical component according to claim 15, wherein the opening comprises a slot having a size and shape for mating with the optical element.

18. An optical component according to claim 15, wherein the optical element comprises at least one of a polarisation rotation component, a wave plate, and a filter.

19. An optical component according to claim 15, wherein the optical element comprises a Wollaston Prism.

20. An optical component according to claim 15, wherein the opening is formed within the end face of the lens.

21. An optical component according to claim 15, wherein the position of the opening within the first lens for accommodating another optical component is determined in dependence upon at least a target optical performance of the optical component.

* * * * *